Feb. 17, 1925.
G. H. LANG
1,526,482
HINGED AUTO TIRE RIM
Filed Jan. 13, 1923
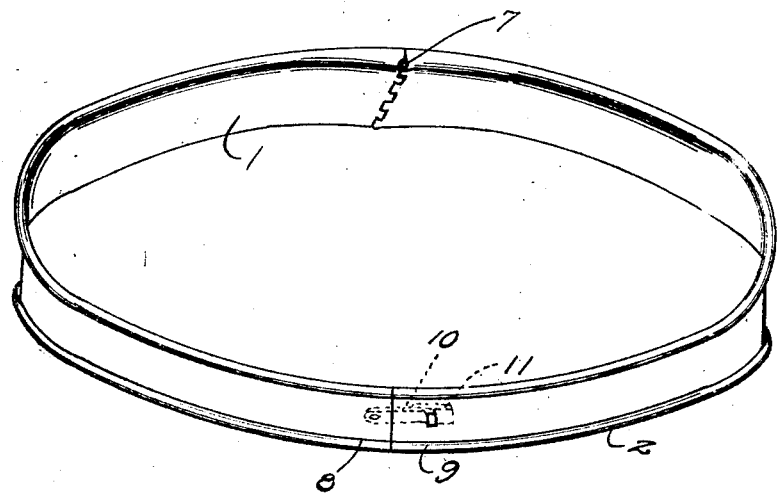
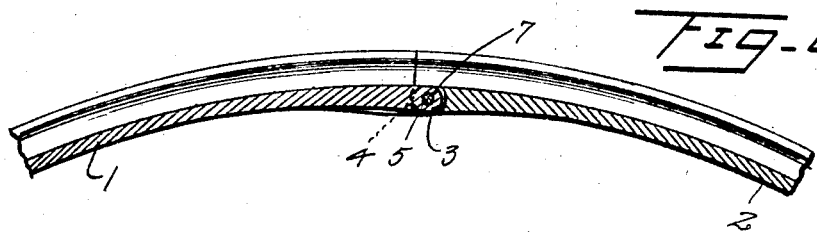
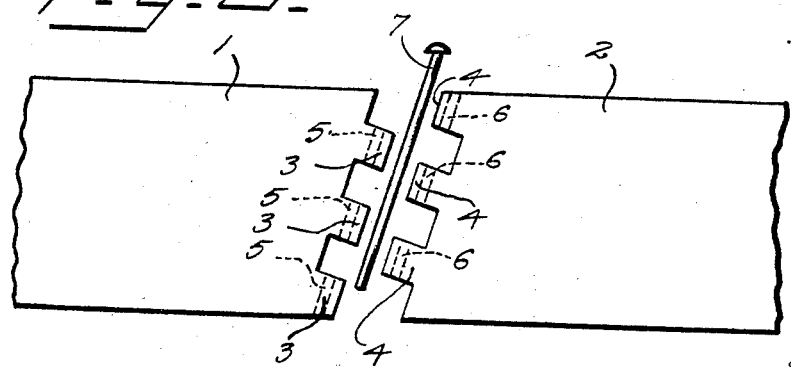
Inventor
G. H. Lang,
By William J. Jacobi
Attorney Patented Feb. 17, 1925.

1,526,482

UNITED STATES PATENT OFFICE.

GERALD H. LANG, OF COVINGTON, INDIANA.

HINGED AUTO TIRE RIM.

Application filed January 13, 1923. Serial No. 612,410.

*To all whom it may concern:*

Be it known that GERALD H. LANG, a citizen of the United States, residing at Covington, in the county of Fountain and State of Indiana, has invented certain new and useful Improvements in Hinged Auto Tire Rims, of which the following is a specification.

This invention relates to a hinged auto tire rim and has for its principal object to provide a device whereby a tire may be more quickly and easily placed in proper position upon a tire rim and held thereon.

Another important object of the invention is to provide a hinged auto tire rim of the above mentioned character, which is of such a construction as to enable the same to be easily and quickly placed in position upon a tire and its simplicity renders the same very efficient and easy to operate.

A still further object of the invention is to provide a hinged auto tire rim of the above mentioned character, which is simple in construction, strong, durable and further well adapted for the purpose for which it is designated.

Other objects and advantages of this invention will become apparent during the course of the following description.

In the accompanying drawing forming a part of this specification and in which like numerals designate like parts throughout the same:—

Figure 1 is a perspective view of the hinged auto tire rim showing the same in assembled position.

Figure 2 is a fragmentary view showing the hinged connection between one pair of ends of the segmental members.

Figure 3 is a detail view showing the interfitting connections between the ends of the two segmental members in unassembled position.

In the drawings wherein for the purpose of illustration is shown the preferred embodiment of my invention, the numerals 1 and 2 respectively designate two arcuate segmental rim members provided with the usual flanged sides for the purpose of permitting the same to receive and support a tire and one set of ends of the arcuate segmental rim members 1 and 2 respectively are cut at oblique angles as more clearly shown in Figs. 1 and 3 of the drawings.

The oblique ends of the segmental rim sections 1 and 2 respectively are provided with interfitting fingers 3 and 4 respectively and these interfitting fingers 3 and 4 extend horizontally from the oblique ends of the segmental members 1 and 2. The interfitting members 3 and 4 are provided with transverse registering openings 5 and 6 respectively and when the oblique ends and the interfitting fingers carried thereby are placed together the interfitting fingers 3 carried by the arcuate segmental rim member 1 will fit between the fingers 4 carried by the segmental member 3 and the apertures 5 and 6 will register to provide a transversely extending opening and a suitable pintle 7 will be passed through the interfitting fingers 3 and 4 and will be seated in the registering openings 5 and 6. This arrangement will form a hinged connection between the segmental rim members 1 and 2 and thereby provide a means whereby the rim sections may be freely swung into operative and inoperative positions.

The opposite ends 8 and 9 respectively of the arcuate shaped segmental members 1 and 2 are provided with suitable fastening means such as is shown at 10 and 11 in the drawings. The fastening means associated with the free ends of the segmental members 1 and 2 may be of any suitable construction and I do not wish to confine myself to the particular fastening means used in conjunction with my rim.

When it is desired to place a tire upon the rim for use upon one of the wheels of the vehicle, the fastening means 10 and 11 are separated and the segmental members 1 and 2 may be swung inwardly so as to enable the same to be placed within the tire in such a manner as to cause the beads of the tire to fit between the flanged sides of the rim sections 1 and 2 and after the tire has been placed around the rim the free ends 8 and 9 of the rim will be expanded in such a manner to cause the fastening means 10 and 11 to lock the rim sections 1 and 2 in their expanded position and thereby form a complete circle and furthermore hold the tire in position upon the rim.

It will thus be seen from the foregoing description that a demountable rim has been provided which may be easily and quickly adjusted in position for receiving and holding a tire in place thereon and furthermore does not necessitate the employment of considerable time and use of several implements in order to accomplish the necessary results. Furthermore the simplicity of my demountable rim renders the same inexpensive and does not interfere with the arrangement of the tire on the rim at the hinged connection between the segmental sections.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

A demountable rim for vehicle wheels comprising a pair of semi-circular rim sections provided with clincher flanges at their edges, one pair of the meeting edges being of relatively great thickness and provided with registering sleeves, a hinge pin passing through the sleeve, and means for locking the free ends of the rim sections together, the registering sleeves being arranged at an oblique angle with respect to the transverse axis of the rim.

In testimony whereof I affix my signature.

GERALD H. LANG.